US011880217B2

(12) United States Patent
Xu

(10) Patent No.: US 11,880,217 B2
(45) Date of Patent: Jan. 23, 2024

(54) POWER MANAGEMENT CIRCUIT WITH CONSTANT TIME CONTROL AND ASSOCIATED OPERATING METHODS

(71) Applicant: Chengdu Monolithic Power Systems Co., Ltd., Chengdu (CN)

(72) Inventor: Min Xu, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 30 days.

(21) Appl. No.: 17/699,454

(22) Filed: Mar. 21, 2022

(65) Prior Publication Data

US 2023/0004182 A1    Jan. 5, 2023

(30) Foreign Application Priority Data

Jun. 30, 2021  (CN) .......................... 202110732915.1

(51) Int. Cl.
*H02M 3/158*   (2006.01)
*G05F 1/66*   (2006.01)

(52) U.S. Cl.
CPC ............ *G05F 1/66* (2013.01); *H02M 3/1582* (2013.01)

(58) Field of Classification Search
CPC .. H02M 1/12; H02M 3/3155; H02M 3/33507; H02M 3/33546; H02M 7/1557; H02M 7/1626; H02M 1/4208; H02M 7/53871; H02M 7/12; H02M 7/219; H02M 7/151; H02M 1/4233; H02M 5/4585; H02M 7/217; H02M 1/08; H02M 7/1552; H02M 7/1623; H02M 1/4225; H02M 3/33592; H02M 3/073; H02M 3/10; H02M 3/135; H02M 3/137; H02M 7/10; H02M 7/00; H02M 7/06; H02M 7/064; H02M 7/068; H02M 3/3376; H02M 3/337; H02M 3/334; H02M 2001/0035; H02M 3/1582; H02M 3/1584; H02M 3/285; H02M 3/33561; H02M 7/49; H02M 1/045; H02M 7/006; H02M 7/153; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/538466; H02M 7/5387; H02M 7/53873; H02M 7/53875; H02M 1/084; H02M 1/0845; G05F 1/30;
(Continued)

(56) References Cited

U.S. PATENT DOCUMENTS 9,711,975 B2   7/2017  Xu et al.
9,882,405 B2   1/2018  Xu et al.
(Continued)

*Primary Examiner* — Thienvu V Tran
*Assistant Examiner* — Nusrat Quddus
(74) *Attorney, Agent, or Firm* — Perkins Coie LLP

(57) ABSTRACT

An integrated circuit for a power management circuit is provided. The integrated circuit has a power input pin, a system output pin for providing an output voltage, a switching node pin coupled to a battery through an inductor, a ground pin, a first switch coupled between the system output pin and the switching node pin, a second switch coupled between the switching node pin and the ground pin, and a control circuit. The control circuit controls the first switch and second switch to operate in a buck mode or a boost mode. The first switch is turned OFF for a constant time, and the second switch is turned ON for the constant time.

18 Claims, 8 Drawing Sheets

(58) Field of Classification Search
CPC ..... G05F 1/33; G05F 1/32; G05F 1/34; G05F 1/38; G05F 1/52; H02J 7/12; H02J 3/46; H02J 3/38; G01R 19/165; G01R 19/16504; G01R 19/16509; G01R 19/16514; G01R 19/16519; G01R 19/16523; G01R 19/16528; G01R 19/16533; G01R 19/16538; G01R 19/16542; G01R 19/16547; G01R 19/16552; G01R 19/16557; G01R 19/16561; G01R 19/16566; G01R 19/16571; G01R 19/16576; G01R 19/1658; G01R 19/16585; G01R 19/1659; G01R 19/16595; G01R 19/17
See application file for complete search history.

(56) References Cited

U.S. PATENT DOCUMENTS

| | | | | |
|---|---|---|---|---|
| 2006/0291257 | A1* | 12/2006 | Williamson | H02M 11/00 363/16 |
| 2014/0203761 | A1* | 7/2014 | Paparrizos | H02M 3/1582 320/107 |
| 2015/0162831 | A1* | 6/2015 | Ladret | H01L 27/06 307/23 |
| 2021/0036533 | A1* | 2/2021 | Sporck | H02J 7/0071 |

\* cited by examiner

POWER MANAGEMENT CIRCUIT WITH CONSTANT TIME CONTROL AND ASSOCIATED OPERATING METHODS

CROSS-REFERENCE TO RELATED APPLICATION

This application claims the benefit of CN application No. 202110732915.1 filed on Jun. 30, 2021 and incorporated herein by reference.

TECHNICAL FIELD

This disclosure relates generally to electrical circuit, and more particularly but not exclusively relates to an integrated circuit used in a power management circuit and associated operating methods.

BACKGROUND

FIG. 1 schematically illustrates a prior power management system 10, which is suitable for applications such as a power bank, a headset with blue tooth and so on. When the power management system 10 is connected to a power source VS, the power source VS is used to supply a system load RL along a first electrical pathway 151 through a switch Q3 shown in FIG. 1. Meantime, the power source VS is also used to charge a battery BATT with a charging current along a second electrical pathway 152. When the power source VS is not available and disconnects from the power management system 10, the battery BATT will supply the system load RL along a third electrical pathway 153.

When the power management system 10 is connected to the power source VS and the system load RL increases, the power source VS will reduce the charging current to charge the battery BATT, to meet the system load requirement. If the system load RL continue to increase so that the power requirement of the system load RL exceeds the power ability of the power source VS, the power source VS as well as the batter BATT will supply power to the system load RL along both the second electrical pathway 152 and the third electrical pathway 153. And thus there is a need for a bi-directional operating circuit between the power source VS and the battery BATT, and the bi-directional operating circuit can both support the charging electrical pathway 152 from the power source VS to the battery BATT and the discharging electrical pathway 153 from the battery BATT to the system load RL.

As shown in FIG. 1, a bi-directional switching circuit 20 having an inductor L1, a first switch Q1 and a second switch Q2, is coupled between the power source VS and the battery BATT. The switch Q3 is coupled between the power source VS and the bi-directional switching circuit 20, and is a normally on transistor when the power source VS is available. When the power source VS is configured to charge the battery BATT, the inductor L1, the first switch Q1 and the second switch Q2 construct a buck circuit and the bi-directional switching circuit 20 operates in a buck mode. When the battery BATT discharges to supply the system load RL, the inductor L1, the first switch Q1 and the second switch Q2 construct a boost circuit and the bi-directional switching circuit 20 operates in a boost mode. However, during the transition from the buck mode to the boost mode, the battery BATT starts to discharge from being charged, the power supplied to the system load RL will be interrupted, and may cause the power failure.

SUMMARY

In accomplishing the above and other objects, there has been provided an integrated circuit for a power management circuit having an external inductor and a rechargeable battery. The integrated circuit comprises a power input pin, a system output pin to output an output voltage, a switching mode pin coupled to the battery through the inductor, a ground pin, a first switch, a second switch and a control circuit. The first switch has a first terminal, a second terminal and a control terminal, wherein the first terminal is coupled to the system output pin, the second terminal is coupled to the switching node pin, and the control terminal is driven by a first driving signal. The second switch has a first terminal, a second terminal and a control terminal, wherein the first terminal is coupled to the switching node pin, the second terminal is coupled to the ground pin, and the control terminal is driven by a second driving signal. The control circuit is configured to control the first switch and the second switch to operate in a buck mode or a boost mode, and wherein the first switch is turned OFF for a constant time, and the second switch is turned ON for the constant time.

There also has been provided a method of operating a power management circuit having a first pin, a second pin, a third pin, a fourth pin, a first switch coupled between the second pin and the third pin, a second switch coupled between the third pin and the fourth pin, an external inductor coupled between the third pin and a rechargeable battery. The method comprises: selecting a minimum value among a plurality of feedback control signals as a feedback control signal, providing a first current sensing signal by sensing a current flowing through the inductor, providing a second current sensing signal by adding a DC offset voltage on to the first current sensing signal, comparing the selected feedback control signal with the second current sensing signal and providing a first comparison signal, generating a constant time control signal with a constant time based on the first comparison signal, providing a first control signal and a second control signal based on the first comparison signal and the constant time control signal, and configuring the first switch and the second switch to operate in a buck mode or a boost mode, respectively controlling the OFF-time of the first switch and the ON-time of the second switch to be the constant time.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of the embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Those skilled in the art should understand that the meanings of the terms identified above do not necessarily limit the terms, but merely provide illustrative examples for the terms.

Figure 1:
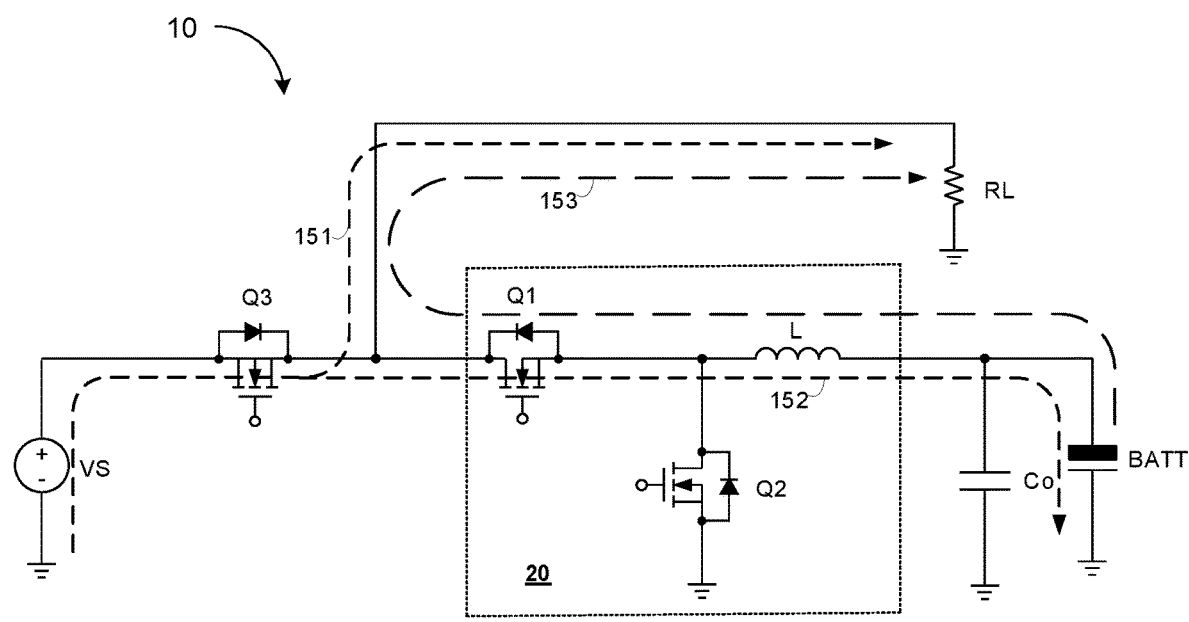
FIG. 1 illustrates a prior power management system 10.
Figure 2:
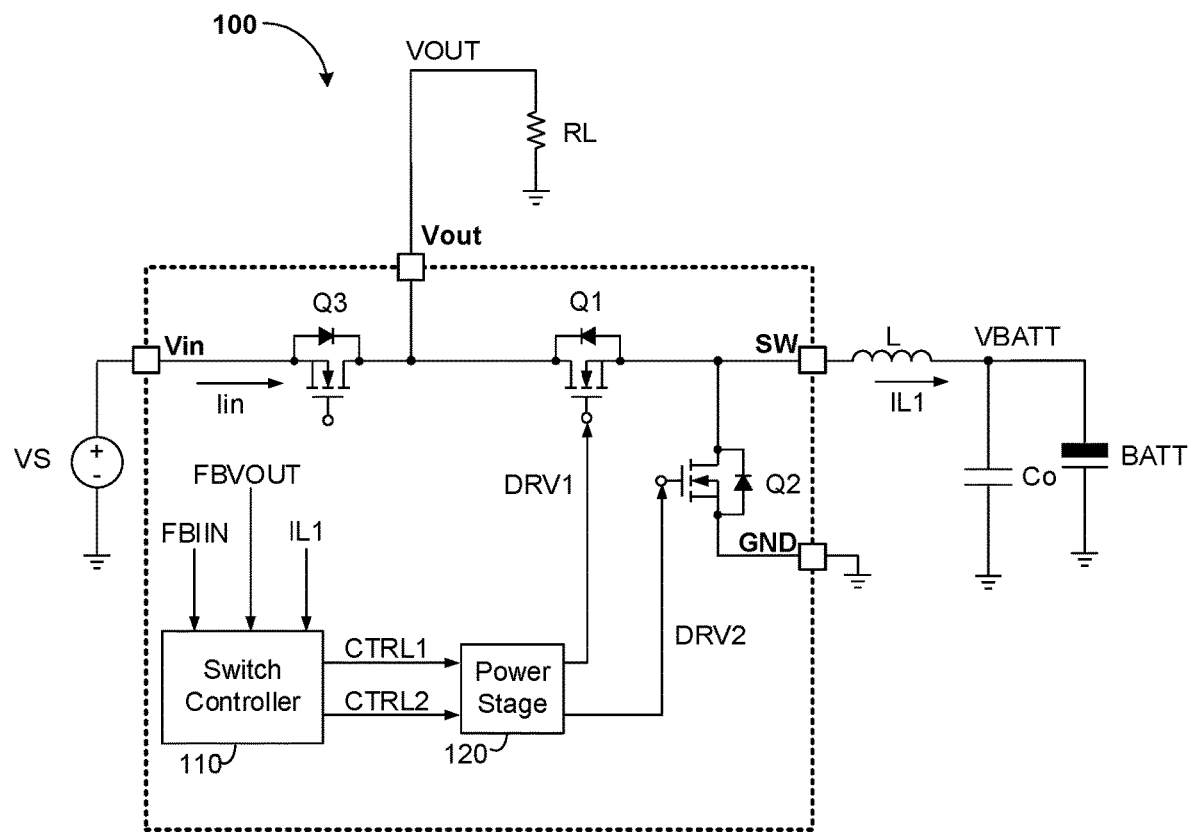
FIG. 2 schematically illustrates a power management circuit 100 with an integrated circuit according to an embodiment of the present invention.

FIG. 2 schematically illustrates a power management circuit 100 with an integrated circuit according to an embodiment of the present invention. As shown in FIG. 2, the power management circuit 100 comprises an integrated circuit, an inductor L, a rechargeable battery BATT, an output capacitor Co, and supplies power for a system load RL. The integrated circuit comprises a power input pin Vin, a system output pin Vout, a switching node pin SW, a ground pin GND, a first switch Q1, a second switch Q2, a blocking switch Q3 for limiting an input current and a control circuit.

The power input pin Vin is coupled to an external power source VS. The system output pin Vout is coupled to the system load RL for outputting an output voltage VOUT. The integrated circuit is configured to convert an input voltage VIN from the power source VS into the output voltage VOUT through the blocking switch Q3 and supplies power to the system load RL.

The first switch Q1 has a first terminal, a second terminal and a control terminal, wherein the first terminal is coupled to the system output pin Vout, the second terminal is coupled to the switching node pin SW, and the control terminal is driven by a first driving signal DRV1. The second switch Q2 has a first terminal, a second terminal and a control terminal, wherein the first terminal is coupled to the switching node pin SW, the second terminal is coupled to the ground pin GND, and the control terminal is driven by a second driving signal DRV2. The blocking switch Q3 is coupled between the power input pin Vin and the system output pin Vout, and keeps normally on when the power source VS is available.

As shown in FIG. 2, the inductor L has a first terminal and a second terminal, wherein the first terminal is coupled a common node of the first switch Q1 and the second switch Q2, i.e., the switching node pin SW. The second terminal of the inductor L is coupled to a positive terminal of the battery BATT, and a negative terminal of the battery BATT is coupled to the ground. In the example shown in FIG. 2, the integrate circuit and the inductor L can construct a forward buck circuit or a reverse boost circuit, to supply the system load RL. The control circuit controls the first switch Q1 and the second switch Q2 to work complementarily, to operate in a buck mode or a boost mode. Wherein an OFF-time of the first switch Q1 is a constant time tcosnt, and the ON-time of the first switch Q2 is also the constant time tcosnt. In one embodiment, the integrated circuit works in a forced current continuous mode (CCM).

As shown in FIG. 2, the control circuit of the integrated circuit comprises a switch controller 110 and a power stage 120. The switch controller 110 is configured to receive a plurality of feedback control signals and a first current sensing signal IL1 indicative of a current flowing through the inductor L. Based on the plurality of feedback control signals and the first current sensing signal IL1, the switch controller 110 provides a first control signal CTRL1 and a second control signal CTRL2 to the power stage 120. The power stage 120 comprises a first driving circuit and a second driving circuit. The first driving circuit is configured to provide a first driving signal DRV1 to control the first switch Q1 based on the first control signal CTRL1. The second driving circuit is configured to provide a second driving signal DRV2 to the second switch Q2 based on the second control signal CTRL2. The first driving signal DRV1 and the second driving signal DRV2 are complementary signals. In other words, when the first driving signal DRV1 is high level, the second driving signal DRV2 is low level, when the first driving signal DRV1 is low level, the second driving signal DRV2 is high level.

In the forward buck mode, the first switch Q1 is turned on in response to the first driving signal DRV1 with high level, and the second switch Q2 is turned off in response to the second driving signal DRV2 with low level. On the contrary, in the reverse boost mode, the first switch Q1 is turned OFF in response to the first driving signal DRV1 with low level, and the second switch Q2 is turned ON in response to the second driving signal DRV2 with high level.

In one embodiment, the switch controller 110 comprises a plurality of feedback control circuits. Different feedback control circuits perform different feedback detection and loop regulation, which can provide different feedback control signals, respectively. In detail, each feedback control circuit receives a corresponding feedback signal and a corresponding reference signal and provides a corresponding feedback control signal at a corresponding output terminal based on a difference between the corresponding feedback signal and the corresponding reference signal. The plurality of feedback signals at least comprise an output voltage feedback signal FBVOUT indicative of the output voltage VOUT at the system output pin Vout, and an input current feedback signal FBIIN indicative of the input current Iin flowing into the power input pin Vin. In other embodiments, the plurality of feedback signals further comprise a temperature feedback signal indicative the temperature of the power management circuit 100, an input voltage feedback signal, a battery voltage feedback signal, a charging current feedback signal and other battery status signal during the charging.

According to an embodiment of the present invention, a feature of the present invention is that the control circuit of the integrated circuit only generates one constant time tconst, which is the constant off time of the first switch Q1, and meantime, is also the constant on time of the second switch Q2.

Figure 3:
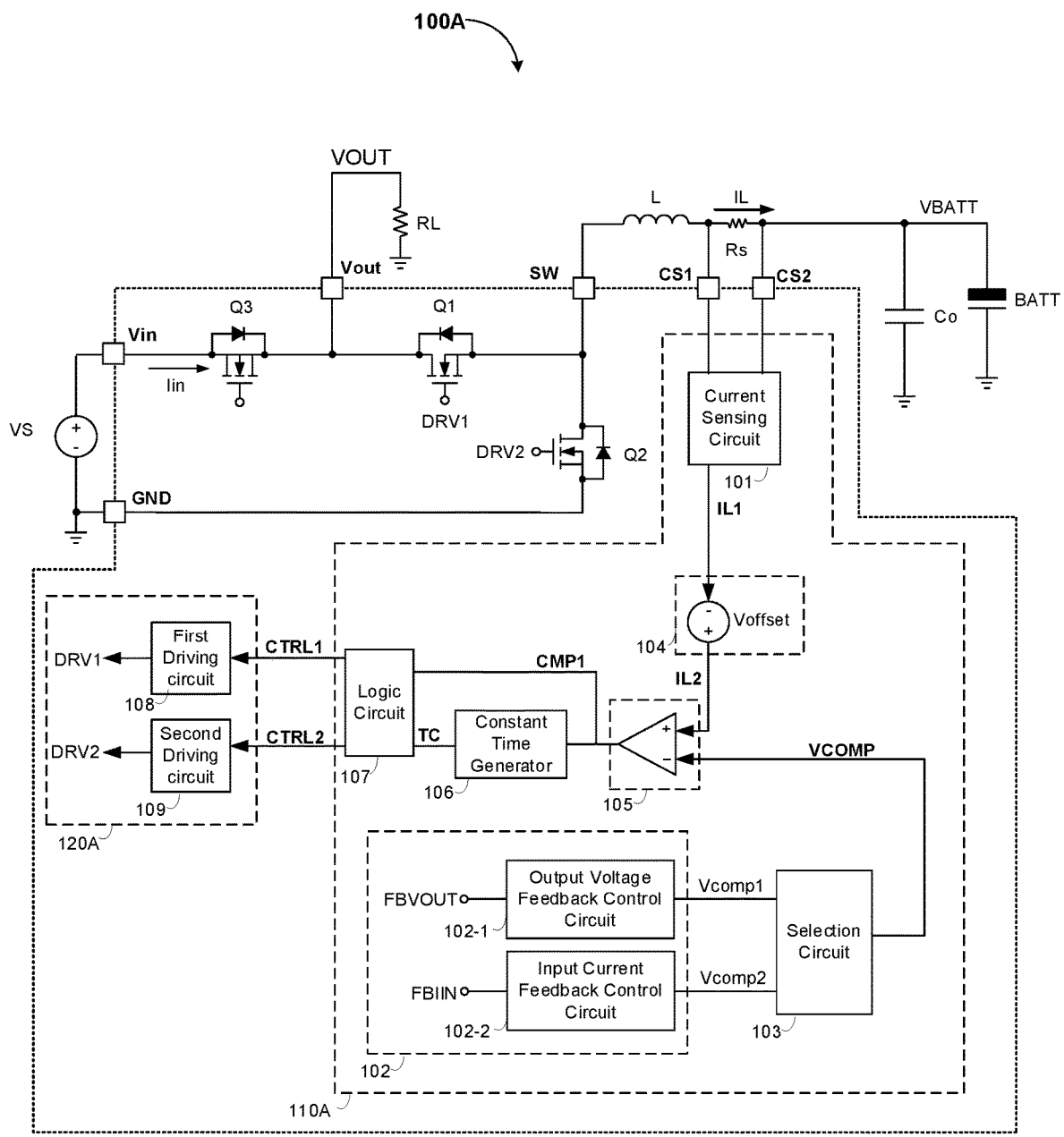
FIG. 3 schematically illustrates a power management circuit 100A with an integrated circuit according to another embodiment of the present invention.

FIG. 3 schematically illustrates a power management circuit 100A with an integrated circuit according to another embodiment of the present invention. As shown in FIG. 3, the power management circuit 100A comprises an integrated circuit, an inductor L, a rechargeable battery BATT and an output capacitor Co. The power management circuit 100A supplies power for a system load RL.

In the example shown in FIG. 3, the integrated circuit comprises a power input pin Vin, a system output pin Vout, a switching node pin SW, a ground pin GND, a first switch Q1, a second switch Q2, a blocking switch Q3 for limiting an input current and a control circuit.

Compared with the power management circuit 100, the power management circuit 100A shown in FIG. 3 further comprises a current sensing resistor Rs. The current sensing resistor Rs is coupled between a second terminal of the inductor L and the battery BATT, and is configured to sense a charging current to charge the battery BATT in the forward buck mode and the sense a discharging current from the battery BATT to the load in the reverse boost mode.

In one embodiment, compared with the integrated circuit shown in FIG. 2, the integrated circuit shown in FIG. 3 further comprises a first current sensing pin CS1 and a second current sensing pin CS2. The current sensing resistor Rs is coupled between the first current sensing pin CS1 and the second current sensing pin CS2. A current sensing circuit 101 is coupled to the two terminals of the current sensing resistor Rs through the two current sensing pins CS1 and CS2, and is configured to provide a first current sensing signal IL1 at an output terminal by sensing a bi-directional current that flows through the current sensing resistor Rs. A person of ordinary skill in the art should know that in other embodiments, the current sensing circuit 101 may have different circuit configurations while having the same or similar function. The control circuit comprises a switch controller 110A and a power stage 120A.

In the example shown in FIG. 3, the switch controller 110A comprises the current sensing circuit 101 mentioned above, the plurality of feedback control circuits 102, a selection circuit 103, an offset generator 104, a first comparison circuit 105, a constant time generator 106 and a logic circuit 107.

In the example shown in FIG. 3, the plurality of feedback control circuits at least comprise an output voltage feedback control circuit 102-1 and an input current feedback control circuit 102-2. The output voltage feedback control circuit 102-1 receives an output voltage feedback signal FBVOUT, and provides an output voltage feedback control signal Vcomp1 based on the difference between the output voltage feedback signal FBVOUT and an output voltage reference signal REFVOUT. The input current feedback control circuit 102-2 receives an input current feedback signal FBVIN, and provides an input current feedback control signal Vcomp2 based on the difference between the input current feedback signal FBIIN and an input current reference signal VREFIIN.

The selection circuit 102 is coupled to the plurality of the feedback control circuits 102 and receives the plurality of the feedback control signals. In the example shown in FIG. 3, the selection circuit 103 selects a minimum value of the output voltage feedback control signal Vcomp1 and the input current feedback control signal Vcomp2 as a selected feedback control signal VCOMP. The offset generator 104 is configured receive the first current sensing signal IL1, and provides a DC offset voltage VOFFSET and a second current sensing signal IL2 by adding the DC offset voltage VOFFSET on to the first current sensing signal IL1. In one embodiment, the valley of the second current sensing signal IL2 is always higher than 0, by setting the appropriate DC offset voltage VOFFSET.

The first comparison circuit 105 is configured to compare the feedback control signal VCOMP with the second current sensing signal IL2 and provide a first comparison signal CMP1 at an output terminal based on the comparison. The firs comparison circuit 105 comprises a comparator CP1. The constant time generator 106 is coupled to the output terminal of the first comparison circuit 105 to receive the first comparison signal CMP1 and is configured to provide a constant time control signal TC having the constant time tconst. The logic circuit 107 is configure to generate the first control signal CTRL1 and the second control signal CTRL2 based on the first comparison signal CMP1 and the constant time control signal TC.

The power stage 120A comprises a first driving circuit 108 and a second driving circuit 109. The first control signal CTRL1 and the second control signal CTRL2 are provided to the first driving circuit 108 and the second driving circuit 109, respectively. The first driving circuit 108 is configured to provide a first driving signal DRV1 to the control terminal of the first switch Q1, based on the first control signal CTRL1. The second driving circuit 109 is configured to provide a second driving signal DRV2 to the control terminal of the second switch Q2, based on the second control signal CTRL2. Generally, the first driving signal DRV1 and the second driving signal DRV2 are complementary. In one embodiment, the first driving circuit 108 comprises a dead time control circuit to provide an optimally minimized dead time without running into shoot-through conditions.

In applications, an external power source VS is configured to provide a continuous and stable output voltage VOUT, to supply the system load RL. At the same time, the power source VS is configured to charge the battery BATT, and the current flowing through the inductor L is a positive charging current, and thus the battery voltage VBATT continues to increase. In one embodiment, the battery voltage VBATT can be fully charged (e.g., 4.2V) from being fully discharged (e.g., 3V).

The system load RL can be supplied by the power source VS without interruption, as long as the input current flowing through the blocking switch Q3 from the power input pin Vin does not reach the input current threshold. When the system load RL increases to exceed the power ability of the power source VS, the input current Iin starts to increase. Accordingly, the input current feedback signal FBIIN also increases. If the input current Iin increases to exceed the input current threshold, the blocking switch Q3 is configured to operate in a linear regulating mode. And then the input current feedback control signal Vcomp2 will decrease to be less than the output voltage feedback control signal Vcomp1. The selection circuit 103 reselects the input current feedback control signal Vcomp1 as the feedback control signal VCOMP. That means the input current Iin will dominate the loop control instead of the output voltage VOUT. The integrated circuit automatically enters the reverse boost mode and exits from the forward buck mode. The battery BATT discharges and provide supplement power for the system load RL, and thus reducing the supplying burden of the power source VS. The current flowing through the inductor L will be a negative discharging current.

In addition, if the power source VS is un-plugged suddenly, the output voltage VOUT will decrease, and the output voltage feedback signal FBVOUT also decreases. When the output voltage VOUT decreases to an ULVO threshold, the output voltage feedback control signal Vcomp1 also starts to decrease. The selection circuit 103 reselect the lower output voltage feedback control signal Vcomp1 as the feedback control signal VCOMP, and the current flowing through the inductor L will change the direction, the integrated circuit enters into the reverse boost mode. The battery BATT is configured as a supplementary power source to supply the system load RL. As mentioned above, the battery voltage VBATT varies between 3V~4.2V, and the battery BATT is configured to discharge the power to the system load RL, the current flowing through the inductor L is a negative discharging current.

Figure 4:
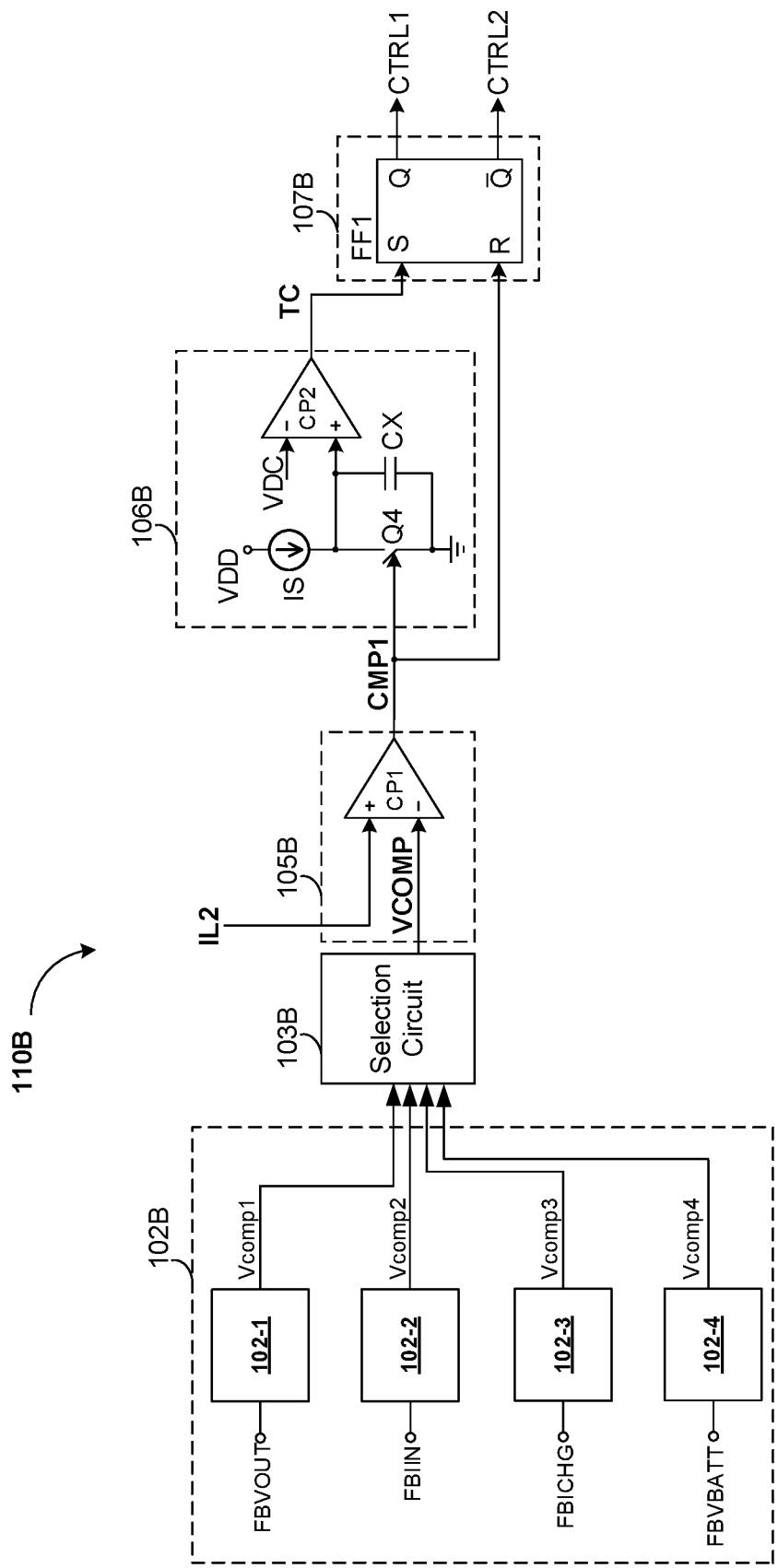
FIG. 4 illustrates a switch controller 110B of the integrated circuit according to an embodiment of the present invention.

FIG. 4 illustrates a switch controller 110B of the integrated circuit according to an embodiment of the present invention. In the example shown in FIG. 4, the switch controller 110B comprises a plurality of feedback control circuits 102B, a selection circuit 103B, a first comparison circuit 105B, a constant time generator 106B and a logic circuit 107B.

As shown in FIG. 4, the plurality of feedback control circuit 102B further comprises a charging current feedback control circuit 102-3 and a battery voltage feedback control circuit 102-4, other than the output voltage feedback control circuit 102-1 and the input current feedback control circuit 102-2 discussed above. The charging current feedback control circuit 102-3 receives a charging current feedback signal FBICHG, and provides a charging current feedback control signal Vcomp3 at an output terminal based on the difference between the charging current feedback signal FBICHG and a charging current reference signal REFICHG. The battery voltage feedback control circuit 102-4 receives a battery voltage feedback signal FBVBATT, and provides a battery voltage feedback control signal Vcomp4 at an output terminal based on the difference between the battery voltage feedback signal FBVBATT and a battery voltage reference signal REFVBATT. The selection circuit 103B selects a minimum value among the output voltage feedback control signal Vcomp1, the input current feedback control signal Vcomp2, the charging current feedback control signal Vcomp3 and the battery voltage feedback control signal Vcomp4 as the selected feedback control signal VCOMP. The selection circuit 103B provides the feedback control signal VCOMP at an output terminal.

The first comparison circuit comprises a comparator CP1. The comparator CP1 has a non-inverting terminal, an inverting terminal and an output terminal, wherein the non-inverting terminal is configured to receive the second current sensing signal IL2, and the inverting terminal is configured to receive the feedback control signal VCOMP, and provides a first comparison signal CMP1 at the output terminal based on the comparison result.

In the example shown in FIG. 4, the constant time generator 106B comprises a current source IS, a discharge switch Q4, a capacitor CX and a comparator CP2. The current source IS has an input terminal configured to receive a supply voltage VDD and an output terminal. The capacitor CX has a first terminal and a second terminal, wherein the first terminal is coupled to the output terminal of the current source IS, and the second terminal is coupled to ground or the ground pin. The discharge switch Q4 has a first terminal, a second terminal and a control terminal, wherein the first terminal is coupled to the output terminal of the current source IS, the second terminal is coupled to ground, and the control terminal is coupled to the output terminal of the first comparison circuit 105B to receive the first comparison signal CMP1. The comparator CP2 has a non-inverting terminal, an inverting terminal and an output terminal, wherein the non-inverting terminal is coupled to the first terminal of the capacitor CX, and the inverting terminal is configured to receive a DC reference voltage VDC, and provides the constant time control signal TC at the output terminal based on the comparison result.

In operation, when the first comparison signal CMP1 is high level, the first switch Q1 is turned OFF, the discharge switch Q4 is turned ON to discharge the capacitor CX. The voltage at the first terminal of the capacitor CX will decrease to approach the reference ground voltage. The comparator CP2 compares the voltage at the first terminal of the capacitor CX with the DC reference voltage VDC. When the voltage of the first terminal of the capacitor CX is less than the DC reference voltage VDC, the comparator CP2 provides the constant time control signal TC with low level. Subsequently, the discharge switch Q4 is turned ON, and the current source IS is allowed to charge the capacitor CX, when the voltage across the capacitor CX increases to reach the DC reference voltage VDC, the comparator CP2 provides the constant time control signal TC with high level. In this configuration, the capacitance of the capacitor CX and/or the time when the capacitor CX is charged to reach the DC reference voltage VDC, which can be used to build the constant time tconst.

Referring still to FIG. 4, the logic circuit 107B comprises a flip-flop FF1. The flip-flop FF1 has a set terminal, a reset terminal, an output terminal and a reverse output terminal. Wherein the set terminal is coupled to the constant time control circuit 106B to receive the constant time control signal TC, the reset terminal is coupled to the output terminal of the first comparison circuit 105B to receive the first comparison signal CMP1. The flip-flop FF1 provides the first control signal CTRL1 at the output terminal and the second control signal CTRL2 at the reverse output terminal. As shown in FIG. 4, the constant time control signal TC with high level can trigger the turning-OFF of the first switch Q1 and the turning-ON of the second switch Q2.

Figure 5:
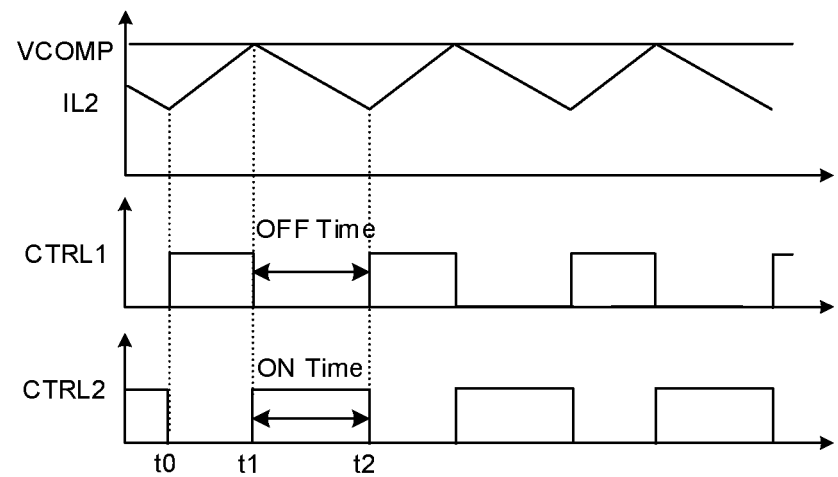
FIG. 5 illustrates a working waveform of the integrated circuit in the buck mode according to an embodiment of the present invention.

FIG. 5 illustrates a working waveform of the integrated circuit in the buck mode according to an embodiment of the present invention. In the example shown in FIG. 5, the first switch Q1 is a main switch, the second switch Q2 is controlled to follow the action of the first switch Q1. As shown in FIG. 5, at time t0, the first switch Q1 is turned ON, and the second switch Q2 is turned OFF, the current flowing through the inductor starts to increase and is configured as the charging current to charge the battery BATT, and the second current sensing signal IL2 also increases until time t1. At time t1, the second current sensing signal IL2 increase to cross the feedback control signal VCOMP, the first switch Q1 is turned OFF, and the second switch Q2 is turned ON. The OFF-time of the first switch Q1 is controlled to be the constant time tconst, which is determined by the constant time control signal TC provided by the constant time control circuit 105. Correspondingly, the ON-time of the second switch Q2 is also controlled to be the constant time tconst. And thus at time t2, the OFF-time of the first switch Q1 ends, the first switch Q1 is turned ON again. The second switch Q2 is turned OFF accordingly. The operation mentioned above is repeated to make the integrated circuit to work in the forward buck mode, wherein the first switch Q1 and the second switch Q2 are turned ON alternatively, to charge the battery BATT.

Figure 6:
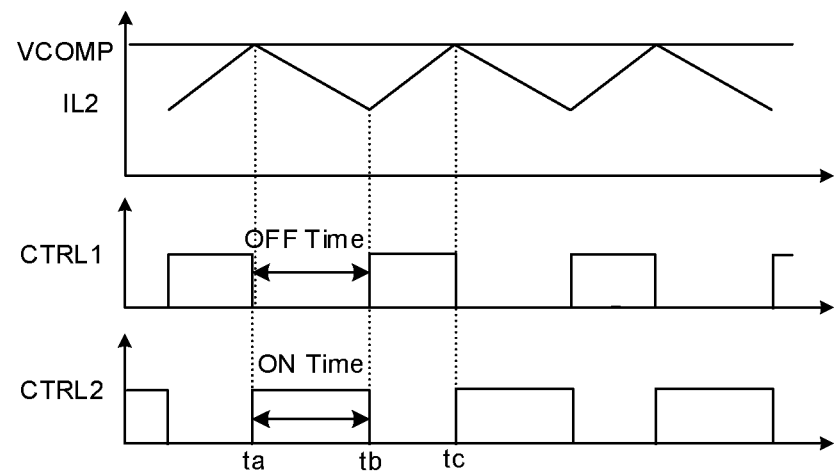
FIG. 6 illustrates a working waveform of the integrated circuit in the boost mode according to another embodiment of the present invention.

FIG. 6 illustrates a working waveform of the integrated circuit in the boost mode according to another embodiment of the present invention. In the example shown in FIG. 6, the second switch Q2 is the main power switch, the first switch Q1 is controlled to follow the action of the second switch Q2. As shown in FIG. 6, at time ta, the second switch Q2 is turned ON, and the first switch Q1 is turned OFF, the current flowing through the inductor is negative and starts to decrease, the second current sensing signal IL2 also decreases. At the same time, the constant time control circuit 105 start to time for the constant time tconst until time tb. At time tb, the second switch Q2 is turned OFF after the constant ON-time tconst, and the first switch Q1 is turned ON after the constant OFF-time tconst. After time tb, the current flowing through the inductor L starts to increase reversely, until the second current sensing signal increases to reach the feedback control signal VCOMP. At time tc, the second switch Q2 is turned ON again, then the first switch Q1 is turned OFF again. The operation mention above is repeated to make the integrated circuit to operate in the reverse boost mode, and the second switch Q2 and the first switch Q1 is turned OFF alternatively. It should be noted that, in the buck mode shown in FIG. 5 and the boost mode shown in FIG. 6, the selected feedback control signal VCOMP is different and it is from different feedback control circuits. Several of the details of the embodiments described below with reference to FIG. 7 and FIG. 8.

Figure 7:
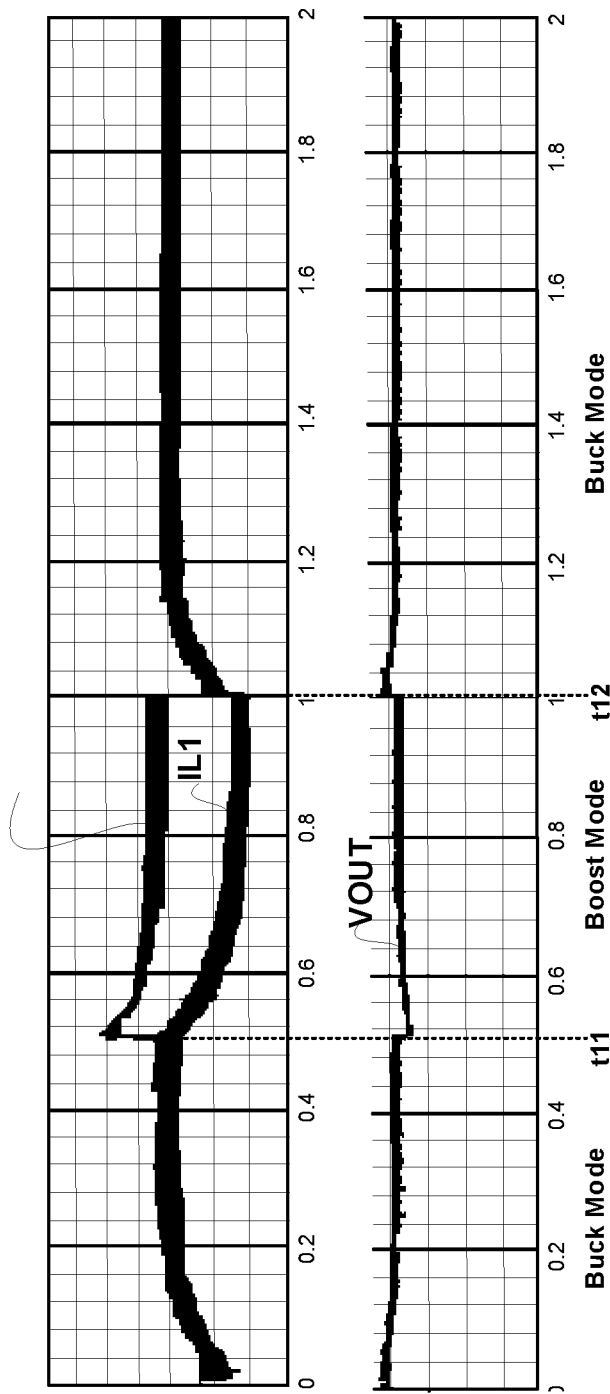
FIG. 7 illustrates a working waveform of the integrated circuit during the transition between the buck mode and the boost mode according to an embodiment of the present invention.

FIG. 7 illustrates a working waveform of the integrated circuit during the transition between the buck mode and the boost mode according to an embodiment of the present invention. As shown in FIG. 7, wherein Iin represents the input current flowing into the power input pin of the integrated circuit, IL1 represents the first current sensing signal, and VOUT represents the output voltage provided to the system load RL.

Before time t11, the power source VS is configured to provide a continuous 5V output voltage VOUT to the system load RL. At the same time, the first current sensing signal IL1 is positive, and the integrated circuit controls the first switch Q1 and the second switch Q2 to operate in the buck mode. The power source VS is configured to provide the charging current to charge the battery BATT.

At time t11, the system load RL increases suddenly, the input current Iin increases to exceed a preset value, and the input current feedback control signal Vcomp1 starts to decrease, and then the input current feedback control signal Vcomp2 is selected to be the feedback control signal VCOMP, to perform the loop control. The current flowing through the inductor L becomes negative and the integrated circuit switches automatically to enter the boost mode from the buck mode. In the boost mode, the input current feedback control signal Vcomp1 is configured to regulate the input current Iin. At time t12, the system load RL decreases, the input current Iin starts to decrease. Then the input current feedback control signal Vcomp2 increases and exists the loop control. The current flowing through the inductor L becomes positive, and the integrated circuit automatically enters the buck mode from the boost mode.

Figure 8:
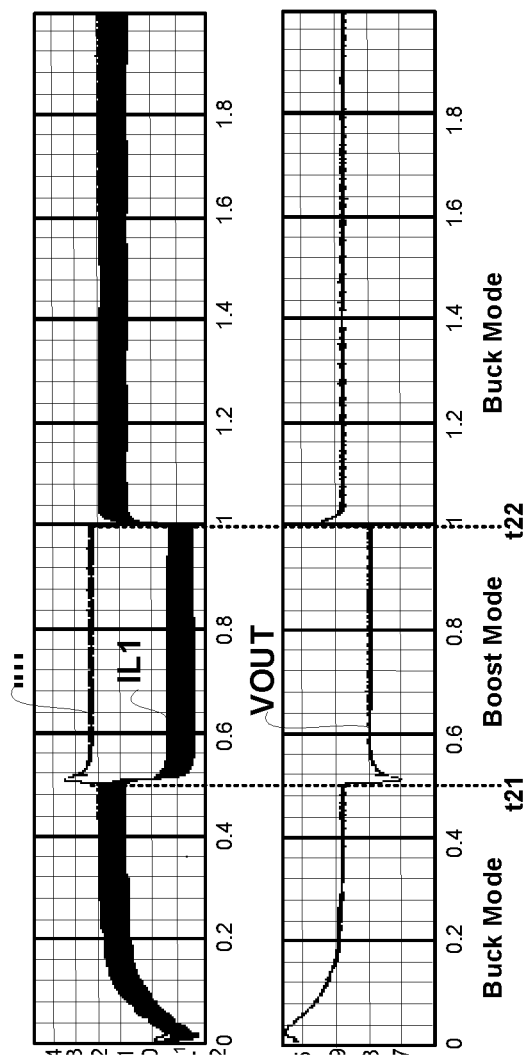
FIG. 8 illustrates a working waveform of the integrated circuit during the transition between the buck mode and the boost mode according to another embodiment of the present invention.

FIG. 8 illustrates a working waveform of the integrated circuit during the transition between the buck mode and the boost mode according to another embodiment of the present invention. As shown in FIG. 8, wherein Iin represents the input current, IL1 represents the first current sensing signal, and VOUT represents the output voltage. Before t11, the power source VS is configured to provide the continuous 5V output voltage VOUT to the system load RL. The first current sensing signal IL1 is positive, and the integrated circuit controls the first switch Q1 and the second switch Q2 to operate in the buck mode. The power source VS is configured to provide the charging current to charge the battery BATT.

At time t21, the power source VS is unplugged suddenly, the output voltage VOUT starts to decrease. When the output voltage VOUT decrease to a threshold (e.g., 4.8V), the output voltage feedback control signal Vcomp1 starts to decrease and is selected by the selection circuit 105 to be the feedback control signal VCOMP, to perform the loop control. The integrated circuit automatically enters the boost mode from the buck mode, the battery BATT is configured to discharge for supplying power to the system load RL. The current flowing through the inductor L changes the direction, the output voltage VOUT is regulated to approach 4.8V. At time t22, the power source VS is plugged and available again. The power source VS is configured to supply the system load RL with 5V output voltage VOUT and charge the battery BATT. The output voltage feedback control signal Vcomp1 increases and exists the loop control. The current flowing through the inductor L becomes positive, and the integrated circuit automatically enters the buck mode from the boost mode.

Figure 9:
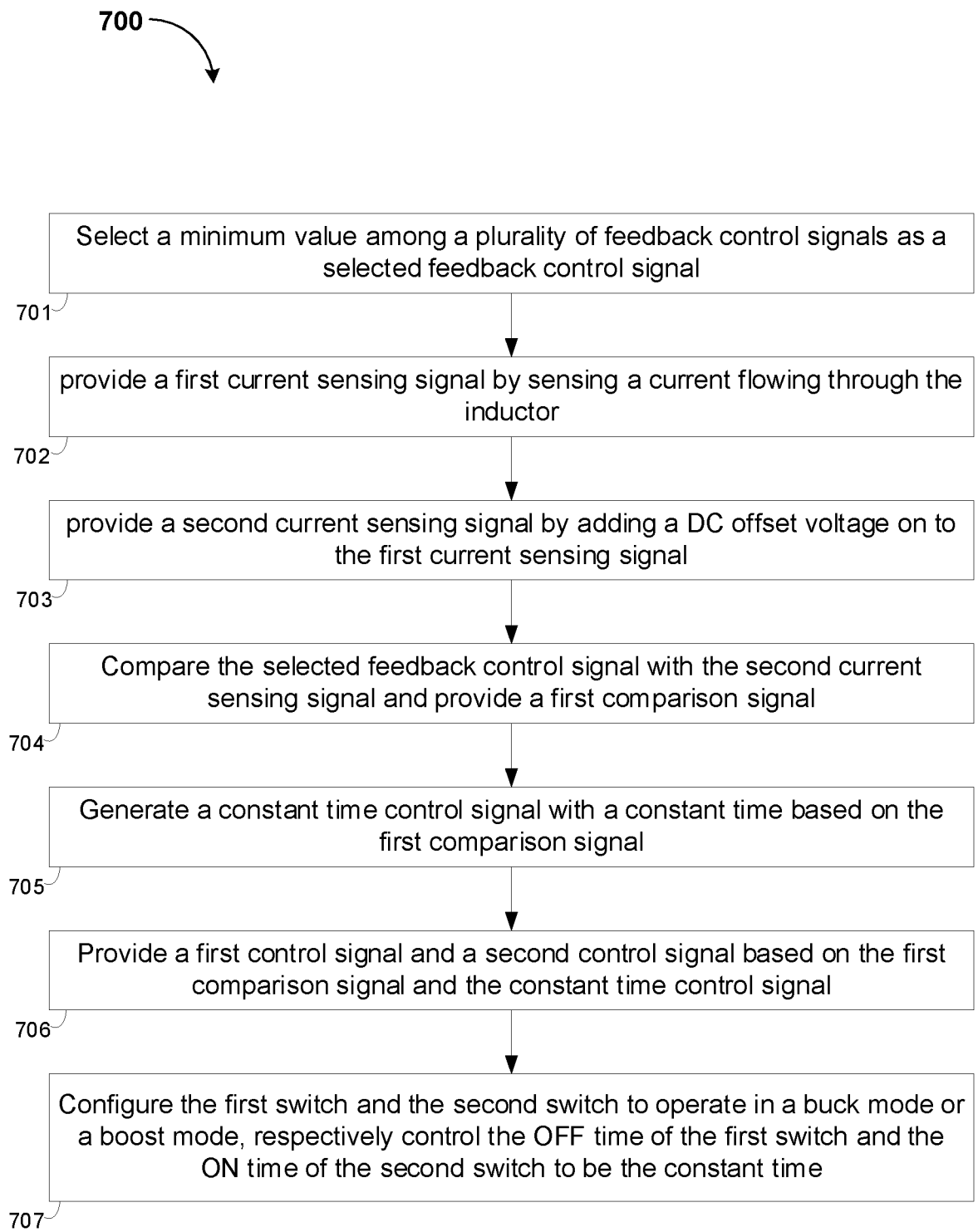
FIG. 9 illustrates a flow chart of a method 700 for operating an integrated circuit shown in FIG. 3 according to one embodiment of the present invention.

FIG. 9 illustrates a flow chart of a method 700 for operating an integrated circuit shown in FIG. 3 according to one embodiment of the present invention. The integrated circuit has a power input pin, a system output pin, a switching node pin, a ground pin, a first switch, a second switch and an external inductor. The first switch is coupled between the system output pin and the switching node pin. The second switch is coupled between the switching node pin and the ground pin. The external inductor is coupled between the system node pin and a rechargeable battery. As shown in FIG. 9, the method 700 comprises steps 701~707.

At step 701, a minimum value among a plurality of feedback control signals is selected as a selected feedback control signal.

In one embodiment, the plurality of feedback control circuits are configured to provide the plurality of feedback control signals. Each of feedback control circuits is configured to receive a corresponding feedback signal and a corresponding reference signal and provide a corresponding feedback control signal at a corresponding output terminal based on a difference between the corresponding feedback signal and the corresponding reference signal. In one embodiment, an input current feedback control signal is provided based an input current flowing into the power input pin of the integrated circuit and an input current reference signal.

At step 702, a first current sensing signal is provided by sensing a current flowing through the inductor.

At step 703, a second current sensing signal is provided by adding a DC offset voltage on to the first current sensing signal. In one embodiment, the valley of the second current sensing signal is higher than 0.

At step 704, the selected feedback control signal is compared with the second current sensing signal, and a first comparison signal is provided based on the comparison result.

At step 705, a constant time control signal with a constant time tconst is generated based on the first comparison signal.

At step 706, a first control signal and a second control signal are provided based on the first comparison signal and the constant time control signal.

In one embodiment, in the buck mode, the first switch is turned OFF based on the first comparison signal, and is turned ON based on the constant time control signal. In the boost mode, the constant time control signal is configured to turn ON the second switch, and the first comparison signal is configured to turn OFF the second switch.

At step 707, the first switch and the second switch are controlled complementarily to operate in the buck mode or the boost mode, and the OFF-time of the first switch and the ON-time of the second switch are both controlled to be the constant time tconst.

In one embodiment, the method 700 further comprises generating a first driving signal and a second driving signal based on the first control signal and the second control signal, and setting a dead time between the first driving signal and the second driving signal.

In this document, relational terms such as first and second, and the like may be used solely to distinguish one entity or action from another entity or action without necessarily requiring or implying any actual such relationship or order between such entities or actions. Numerical ordinals such as "first," "second," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. An integrated circuit for a power management circuit having an external inductor and a rechargeable battery, the integrated circuit comprising:
   a power input pin;
   a system output pin configured to output an output voltage to a load;
   a switching node pin coupled to the battery through the inductor;
   a ground pin;
   a first switch having a first terminal, a second terminal and a control terminal, wherein the first terminal is coupled to the system output pin, the second terminal is coupled to the switching node pin, and the control terminal is driven by a first driving signal;
   a second switch having a first terminal, a second terminal and a control terminal, wherein the first terminal is coupled to the switching node pin, the second terminal is coupled to the ground pin, and the control terminal is driven by a second driving signal; and
   a control circuit configured to control the first switch and the second switch to operate in a buck mode or a boost mode, and wherein the first switch is turned OFF for a constant time, and the second switch is turned ON for the constant time, and the control circuit comprising:
      a plurality of feedback control circuits configured to provide the plurality of feedback control signals, wherein each of the plurality of feedback control circuits is configured to receive a corresponding feedback signal and a corresponding reference signal and provide a corresponding feedback control signal at a corresponding output terminal based on a difference between the corresponding feedback signal and the corresponding reference signal;
      a selection circuit configured to receive the plurality of feedback control signals and select a minimum value among the feedback control signals as a feedback control signal;
      an offset voltage generator configured to receive a first current sensing signal indicative of a current flowing through the inductor and provide a DC offset voltage and a second current sensing signal, wherein the second current sensing signal is generated by adding the DC offset voltage on to the first current sensing signal;
      a first comparison circuit configured to compare the feedback control signal to the second current sensing signal and provide a first comparison signal at an output terminal;
      a constant time generator coupled to the output terminal of the first comparison circuit to receive the first comparison signal and configured to provide a constant time control signal having the constant time; and
      a logic circuit configured to generate a first control signal and a second control signal based on the first comparison signal and the constant time control signal.

2. The integrated circuit of claim 1, wherein the control circuit further comprises:
   a first driving circuit configured to provide the first driving signal to the first switch based on the first control signal; and
   a second driving circuit configured to provide the second driving signal to the second switch based on the second control signal.

3. The integrated circuit of claim 1, wherein the valley of the second current sensing signal is higher than zero.

4. The integrated circuit of claim 1, wherein the constant time generator comprises:
   a current source having an input terminal configured to receive a supply voltage and an output terminal;
   a first capacitor having a first terminal and a second terminal, wherein the first terminal is coupled to the output terminal of the current source, and the second terminal is coupled to the ground pin;
   a discharge switch having a first terminal, a second terminal and a control terminal, wherein the first terminal is coupled to the output terminal of the current source, the second terminal is coupled to the ground pin, and the control terminal is coupled to the first comparison circuit to receive the first comparison signal; and a second comparison circuit configured to compare a voltage at the first terminal of the first capacitor with a reference voltage and provide the constant time control signal.

5. The integrated circuit of claim 1, wherein the logic circuit comprises:

a flip-flop having a set terminal, a reset terminal, an output terminal and a reverse output terminal, wherein the set terminal is coupled to the constant time generator to receive the constant time control signal, the reset terminal is coupled to the first comparison circuit to receive the first comparison signal, the flip-flop provides the first control signal at the output terminal and the second control signal at the reversing output terminal.

6. The integrated circuit of claim 2, wherein the first driving circuit and the second driving circuit both comprise a dead time control circuit.

7. A power management circuit, comprising:

a power input pin coupled a power source to receive an input voltage;

a system output pin configured to output an output voltage to a load;

a switching node pin coupled to a rechargeable battery through an inductor;

a ground pin;

a first switch having a first terminal, a second terminal and a control terminal, wherein the first terminal is coupled to the system output pin, the second terminal is coupled to the switching node pin, and the control terminal is driven by a first driving signal;

a second switch having a first terminal, a second terminal and a control terminal, wherein the first terminal is coupled to the switching node pin, the second terminal is coupled to the ground pin, and the control terminal is driven by a second driving signal; and a control circuit configured to control the first switch and the second switch to operate in a buck mode or a boost mode, and wherein the first switch is turned OFF for a constant time, and the second switch is turned ON for the constant time, the control circuit comprising:

a plurality of feedback control circuits configured to provide the plurality of feedback control signals, wherein each of the plurality of feedback control circuits is configured to receive a corresponding feedback signal and a corresponding reference signal and provide a corresponding feedback control signal at a corresponding output terminal based on a difference between the corresponding feedback signal and the corresponding reference signal;

a selection circuit configured to receive the plurality of feedback control signals and select a minimum value among the feedback control signals as a feedback control signal;

an offset voltage generator configured to receive a first current sensing signal indicative of a current flowing through the inductor and provide a DC offset voltage and a second current sensing signal, wherein the second current sensing signal is generated by adding the DC offset voltage on to the first current sensing signal;

a first comparison circuit configured to compare the feedback control signal to the second current sensing signal and provide a first comparison signal at an output terminal;

a constant time generator coupled to the output terminal of the first comparison circuit to receive the first comparison signal and configured to provide a constant time control signal having the constant time; and a logic circuit configured to generate a first control signal and a second control signal based on the first comparison signal and the constant time control signal.

8. The power management circuit of claim 7, wherein the control circuit comprises:

a first driving circuit configured to provide the first driving signal to the first switch based on the first control signal; and a second driving circuit configured to provide the second driving signal to the second switch based on the second control signal.

9. The power management circuit of claim 7, wherein the valley of the second current sensing signal is higher than 0.

10. The power management circuit of claim 7, wherein the constant time generator comprises:

a current source having an input terminal configured to receive a supply voltage and an output terminal;

a first capacitor having a first terminal and a second terminal, wherein the first terminal is coupled to the output terminal of the current source, and the second terminal is coupled to the ground pin;

a discharge switch having a first terminal, a second terminal and an output terminal, wherein the first terminal is coupled to the output terminal of the current source, the second terminal is coupled to the ground pin, and the control terminal is coupled to the first comparison circuit to receive the first comparison signal; and a second comparison circuit configured to compare a voltage at the first terminal of the first capacitor with a reference voltage and provide the constant time control signal.

11. The power management circuit of claim 7, wherein the logic circuit comprises:

a flip-flop having a set terminal, a reset terminal, an output terminal and a reverse output terminal, wherein the set terminal is coupled to the constant time generator to receive the constant time control signal, the reset terminal is coupled to the first comparison circuit to receive the first comparison signal, the flip-flop provides the first control signal at the output terminal and the second control signal at the reverse output terminal.

12. The power management circuit of claim 8, wherein the first driving circuit and the second driving circuit both comprise a dead time control circuit.

13. A method of operating a power management circuit having a first pin, a second pin, a third pin, a fourth pin, a first switch coupled between the second pin and the third pin, a second switch coupled between the third pin and the fourth pin, an external inductor coupled between the third pin and a rechargeable battery, wherein the method comprising:

selecting a minimum value among a plurality of feedback control signals as a feedback control signal;

providing a first current sensing signal by sensing a current flowing through the inductor;

providing a second current sensing signal by adding a DC offset voltage on to the first current sensing signal;

comparing the selected feedback control signal with the second current sensing signal and providing a first comparison signal;

generating a constant time control signal with a constant time based on the first comparison signal;

providing a first control signal and a second control signal based on the first comparison signal and the constant time control signal; and configuring the first switch and the second switch to operate in a buck mode or a boost mode, respectively controlling the OFF-time of the first switch and the ON-time of the second switch to be the constant time.

14. The method of claim 13, further comprising:

generating a first driving signal and a second driving signal based on the first control signal and the second control signal; and setting a dead time between the first driving signal and the second driving signal.

15. The method of claim 13, further comprising:

providing an input current feedback control signal based on an input current flowing into the first pin of the integrated circuit; and providing an output voltage feedback control signal base on a voltage at the second pin of the integrated circuit.

16. The method of claim 13, wherein in the buck mode, engaging the first comparison signal to control the turning-off of the first switch and engaging the constant time control signal to control the turning-on of the first switch.

17. The method of claim 13, wherein in the boost mode, engaging the constant time control signal to control the turning-on of the second switch and engaging the first comparison signal to control the turning-off of the second switch.

18. The method of claim 13, wherein the valley of the second current sensing signal is higher than zero.

* * * * *